United States Patent
Petrachi

(10) Patent No.: US 11,121,667 B2
(45) Date of Patent: Sep. 14, 2021

(54) MOUNTING SYSTEM FOR ROOF MOUNTED SOLAR PANELS

(71) Applicant: Paolo Pietro Petrachi, St Petersburg, FL (US)

(72) Inventor: Paolo Pietro Petrachi, St Petersburg, FL (US)

( * ) Notice: Subject to any disclaimer, the term of this patent is extended or adjusted under 35 U.S.C. 154(b) by 0 days.

(21) Appl. No.: 16/838,142

(22) Filed: Apr. 2, 2020

(65) Prior Publication Data
US 2020/0321904 A1 Oct. 8, 2020

Related U.S. Application Data

(60) Provisional application No. 62/829,117, filed on Apr. 4, 2019.

(51) Int. Cl.
*H02S 20/23* (2014.01)
*H02S 30/10* (2014.01)

(52) U.S. Cl.
CPC .............. *H02S 20/23* (2014.12); *H02S 30/10* (2014.12)

(58) Field of Classification Search
CPC .......... H02S 20/23; H02S 30/10; H02S 20/00; F24S 25/632; F24S 25/20; F24S 25/61; F24S 25/67; F24S 2025/804; Y02E 10/47
See application file for complete search history.

(56) References Cited

U.S. PATENT DOCUMENTS

| | | | | |
|---|---|---|---|---|
| 4,215,675 A * | 8/1980 | Embree | .................. | F24S 25/67 126/661 |
| 4,372,292 A * | 2/1983 | Ort | .......... | F24S 20/67 126/622 |
| 4,392,009 A * | 7/1983 | Napoli | .................. | H01L 31/048 136/244 |
| 4,677,248 A * | 6/1987 | Lacey | ..................... | F24S 25/65 136/244 |
| 2005/0166955 A1* | 8/2005 | Nath | ....................... | F24S 25/33 136/251 |
| 2009/0200443 A1* | 8/2009 | Burtscher | .............. | F24S 25/636 248/316.1 |
| 2011/0036028 A1* | 2/2011 | Beck | ..................... | F24S 25/636 52/173.3 |
| 2011/0303276 A1* | 12/2011 | Fujii | .................... | C09D 123/22 136/256 |
| 2012/0301661 A1* | 11/2012 | West | ..................... | F24S 25/632 428/99 |
| 2013/0175231 A1* | 7/2013 | Klinga | .................... | F24S 25/65 211/41.1 |
| 2014/0158184 A1* | 6/2014 | West | ..................... | H01L 31/048 136/251 |
| 2015/0295534 A1* | 10/2015 | Maruyama | .............. | H02S 40/34 136/251 |
| 2016/0049900 A1* | 2/2016 | Goldberg | ................ | F24S 40/00 136/251 |
| 2017/0077866 A1* | 3/2017 | MacDonald | ............ | F24S 25/70 |

* cited by examiner

*Primary Examiner* — Jessie T Fonseca

(57) ABSTRACT

A method and apparatus for efficiently securing flexible solar panels on a roof surface that does not require penetration of the roof membrane. The apparatus is composed of extruded aluminum bars with two grooves. The apparatus has a low profile relative to the surface of the roof. The aluminum bars' streamlined design allows free drainage between and over the aluminum structure, as well as an aerodynamic profile to counteract air flow resistance in a high wind environment.

3 Claims, 12 Drawing Sheets

MOUNTING SYSTEM FOR ROOF MOUNTED SOLAR PANELS

CROSS REFERENCE TO RELATED APPLICATIONS

This application claims priority to provisional application Ser. No. 62/829,117 and International Application Number PCT/US19/28048

BACKGROUND OF THE INVENTION

1. Field of the Invention

This invention relates to roof mounted solar panels. More specifically, it relates to a method and apparatus for mounting solar panels on pitched roofs with shingles.

2. Description of the Prior Art

There is a need for a sloped roof solar panel mounting system that attaches to rafters or roof supporting members, avoids using rails or struts, and is universal.

Solar panels must be secured to the roof and underlying structure to disperse wind and snow loads into the building structure. Although some mounting systems avoid using rails attach to the roof decking, they do not attach to the roof rafters because the spacing of rafters is different than the length of typical solar panel modules.

Rails and struts are commonly used to mount solar panels. Rails and struts are long extrusions or roll-formed strips that must be cut to length, use excess material, are costly to manufacture, and are high in shipping cost. Therefore, a mounting system avoiding the use of rails or struts is desired.

There is a need for a solar panel mounting system to be adjustable for mounting to any solar panel module on the market, giving installers the flexibility to choose the solar panel module of their choice, rather than be required to buy a module with a custom profile rail, or the like, to accommodate the mounting system.

The solar panels are typically assembled on the ground, and then mounted directly on a roof of a building, or installed on a dedicated ground or pole mounted frame. In order to minimize the amount of time that workers spend on the roof, it is desirable to have a solar panel mounting system which is easily adaptable to various configurations of solar modules. It is also desirable to have a solar panel mounting system which can secure solar panel modules to the roof without penetrating the roof membrane.

A method and apparatus for efficiently securing flexible solar panels on a roof surface that does not require penetration of the roof membrane is provided. The apparatus is composed of extruded aluminum bars with two grooves. The apparatus has a low profile overall height relative to the surface of the roof. The aluminum bars' streamlined design allows free drainage between and over the aluminum structure, as well as an aerodynamic profile to counteract air flow resistance in a high wind environment.

SUMMARY OF THE INVENTION

It is a major object of the invention to provide an improved method and apparatus for mounting solar panels.

It is another object of the invention to provide an improved method and apparatus for mounting solar panels which can be installed without rails or struts.

It is another object of the invention to provide an improved method and apparatus for mounting solar panels which does not penetrate the roofing membrane.

DETAILED DESCRIPTION OF THE PREFERRED EMBODIMENTS

Figure 1:
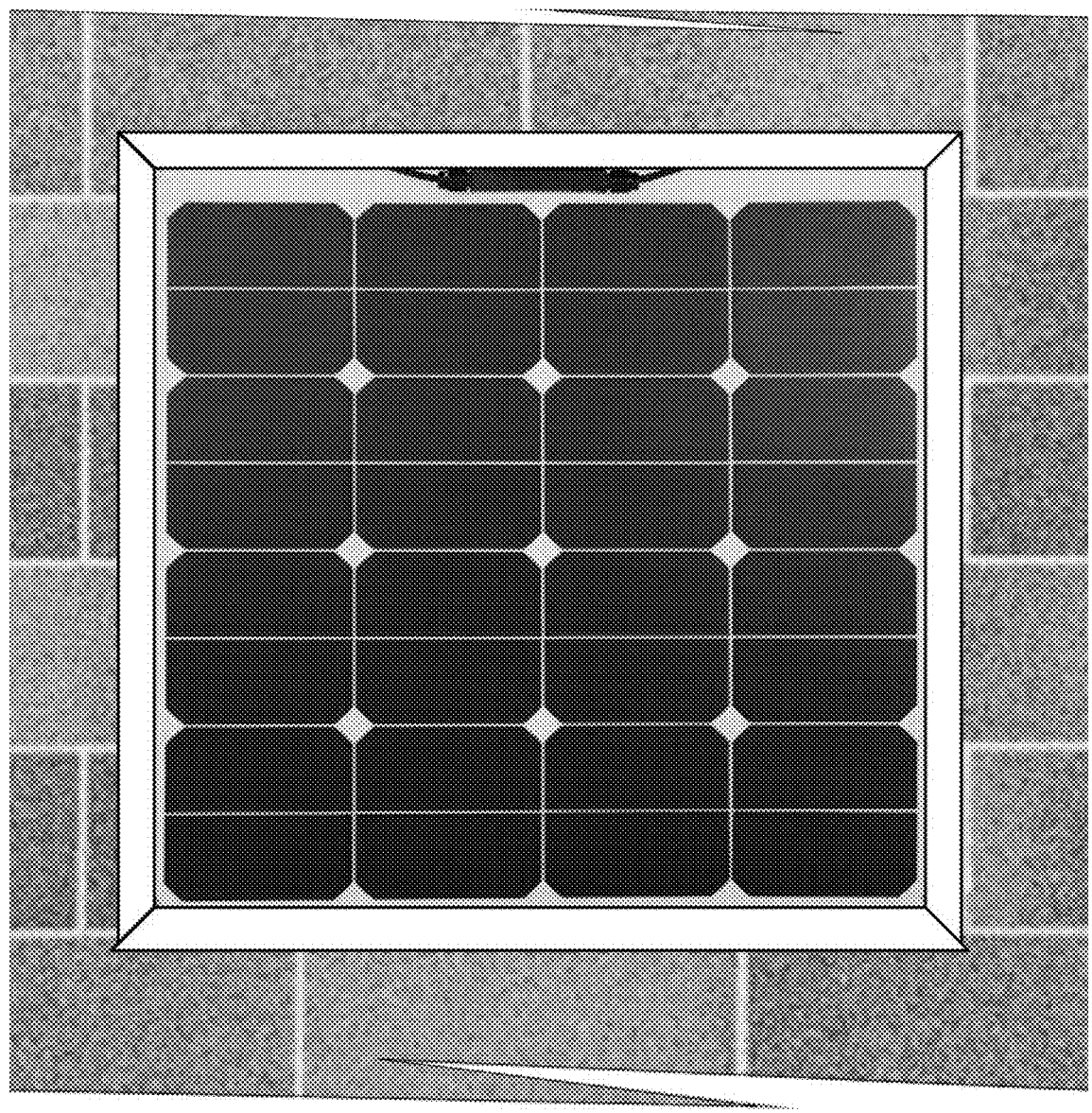
FIG. 1 depicts a typical solar panel in situ on a roof.

Referring now to FIG. 1, the apparatus, generally indicated by the numeral 10, is shown positioned on a roof 4. The apparatus 10 is essentially a bracket or frame for securing one or more solar panels to a roof 4. A key aspect of the invention is that the apparatus 10 can be mounted without penetrating the roof membrane, which greatly reduces the probability of leaks. The elimination of nails, screws, or other penetrating fasteners reduces the amount of effort required by workers thereby enhancing worker safety. The apparatus 10 includes five framing members which are configured for anchoring to a sloped roof as well as containing solar panels of a known or standard size and thickness. The apparatus 10 is specifically designed for use with flexible solar panels 40 having a thickness of about 2-3 mm but the system may be adapted for use with thicker or thinner panels by simply adjusting the relative dimensions of the apparatus 10 as would be apparent to one of skill in the art.

The 3-Tab and architectural asphalt shingles are the most popular roof covering system in the U.S. residential construction market due to their relatively low installation cost and range of aesthetic options. A shingle system consists of overlapping strips of asphalt impregnated organic or glass fiber mats that function as a water shedding skin for structural roof decking. Asphalt shingles manufactured after the 1950s usually have an adhesive asphalt-based sealant strip embedded on the top or lower surface of the shingle that adheres when the roof temperature exceeds the sealant's softening point. The present invention is directed to an apparatus 10 designed for use with 3-Tab and architectural asphalt shingles (and takes advantage of the sealing strip as explained below), but can be readily modified for use with most shingle systems as would be apparent to one of skill in the art.

Figure 2:
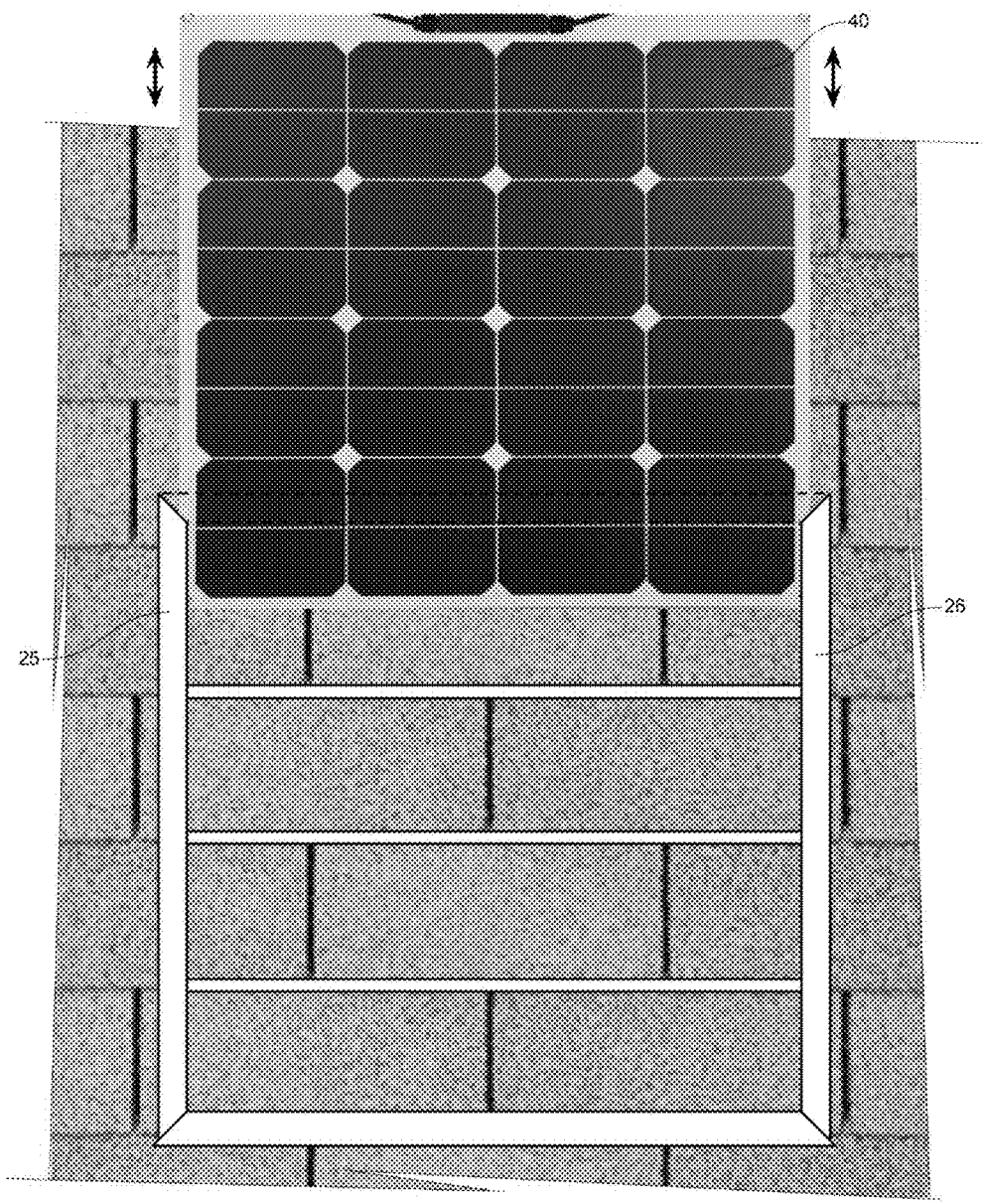
FIG. 2 illustrates a solar panel being installed using the apparatus of the invention.
Figure 3:
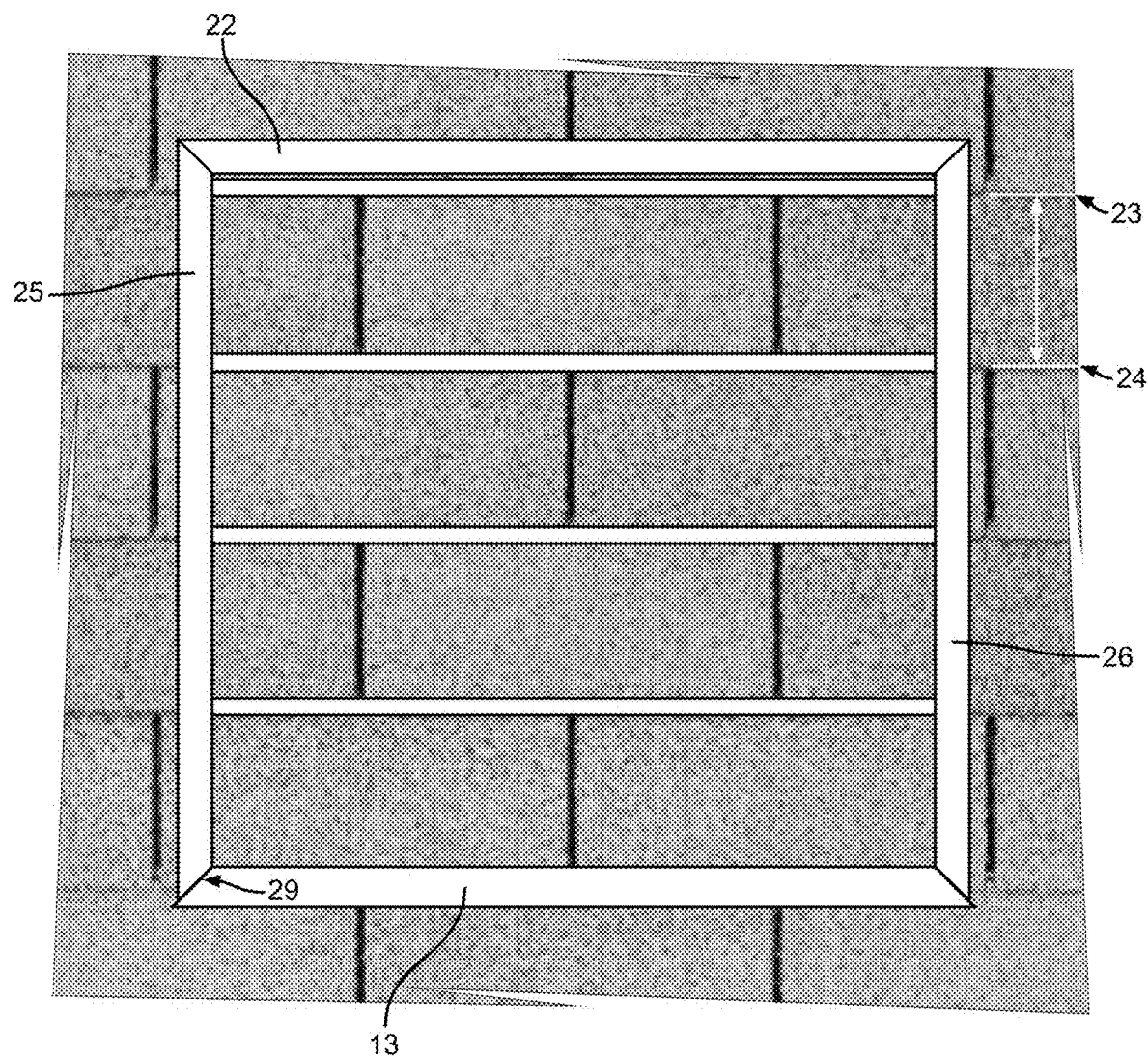
FIG. 3 depicts the apparatus of the invention prior to installation of the solar panel.
Figure 4:
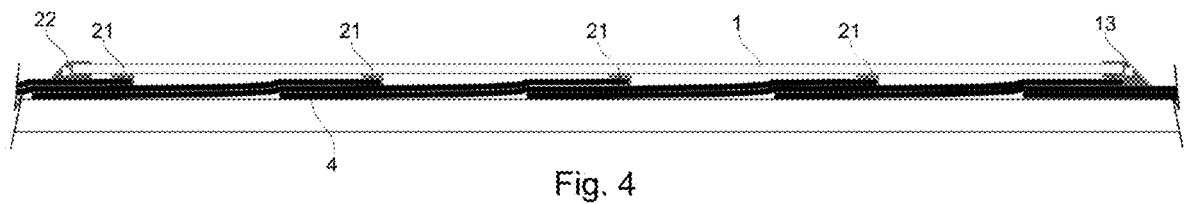
FIG. 4 is a side sectional view of FIG. 3.
Figure 5:
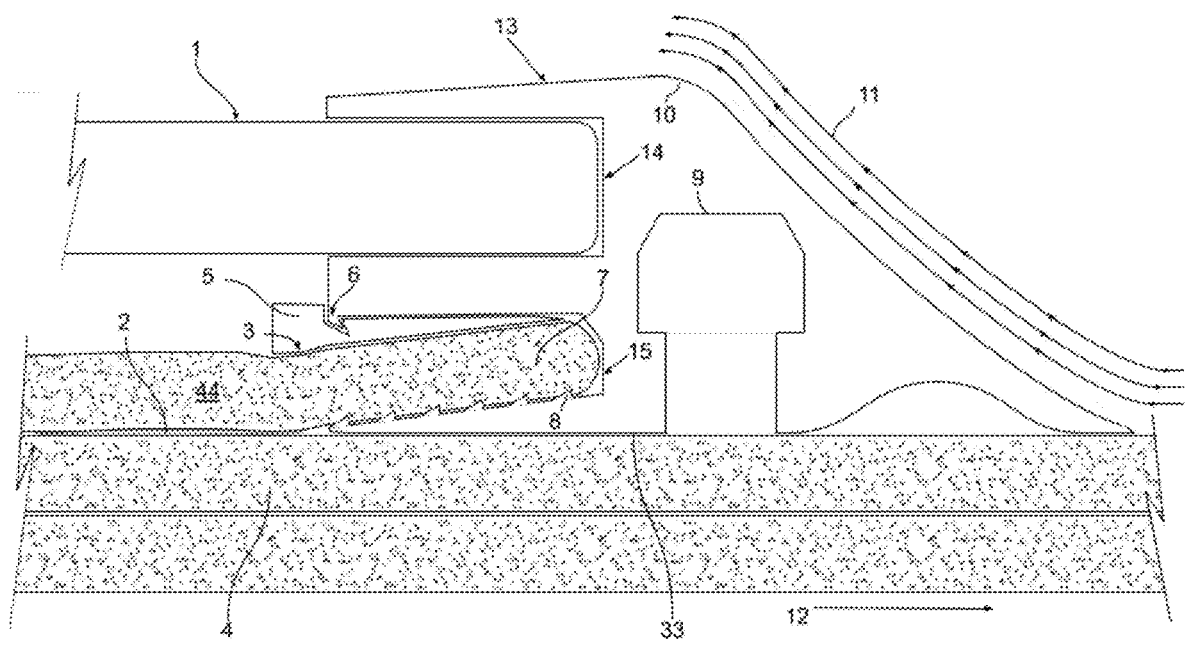
FIG. 5 is a side sectional view detailing an edge region of the solar panel inserted into a bottom framing member of the apparatus.
Figure 6:
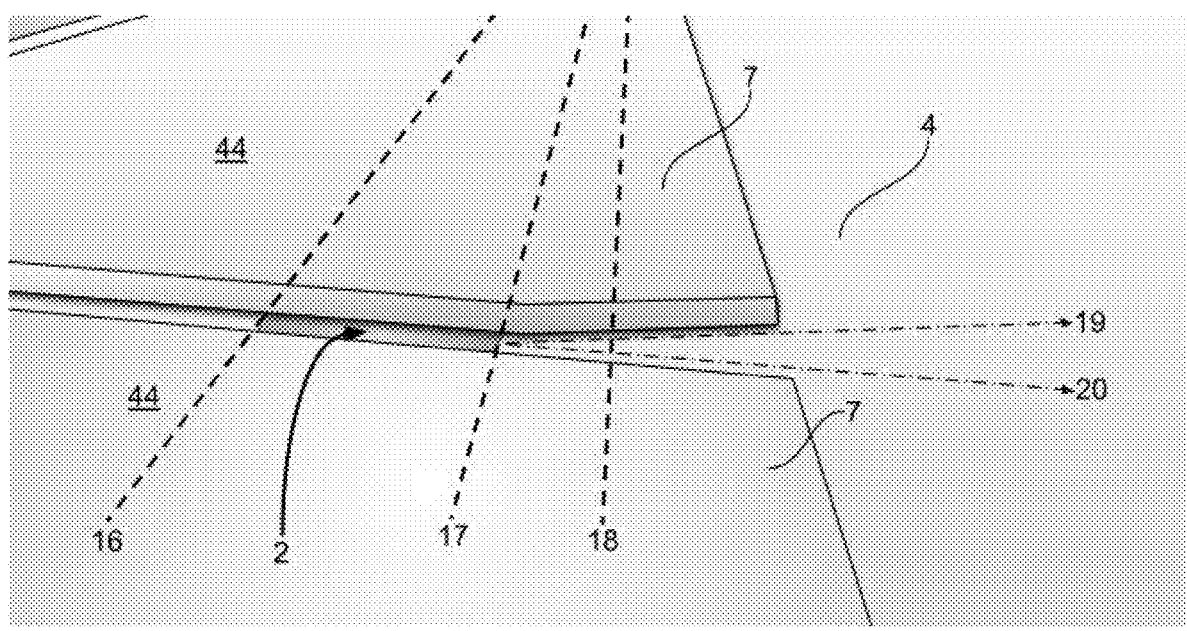
FIG. 6 is a side view illustrating a detail of the shingles' end flap.
Figure 9:
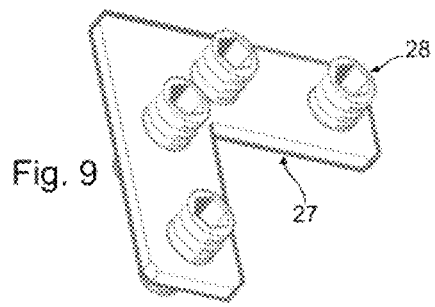
FIG. 9 is a perspective view of a connecting element of the apparatus.
Figure 7:
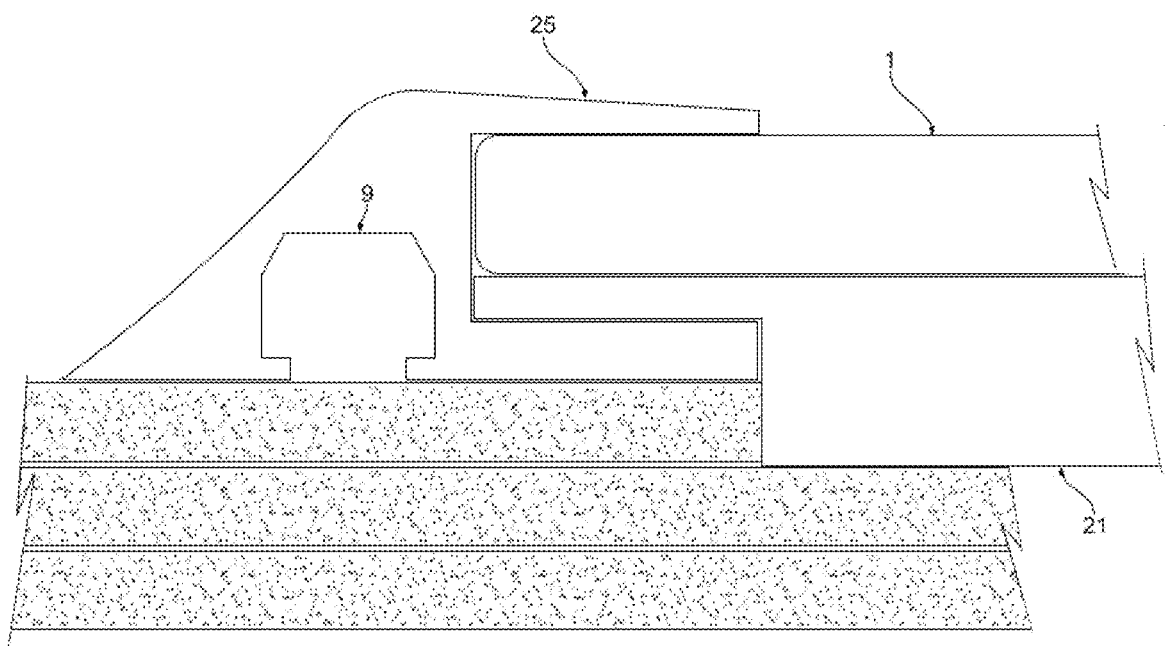
FIG. 7 is a side sectional view of a side framing member of the apparatus.
Figure 8:
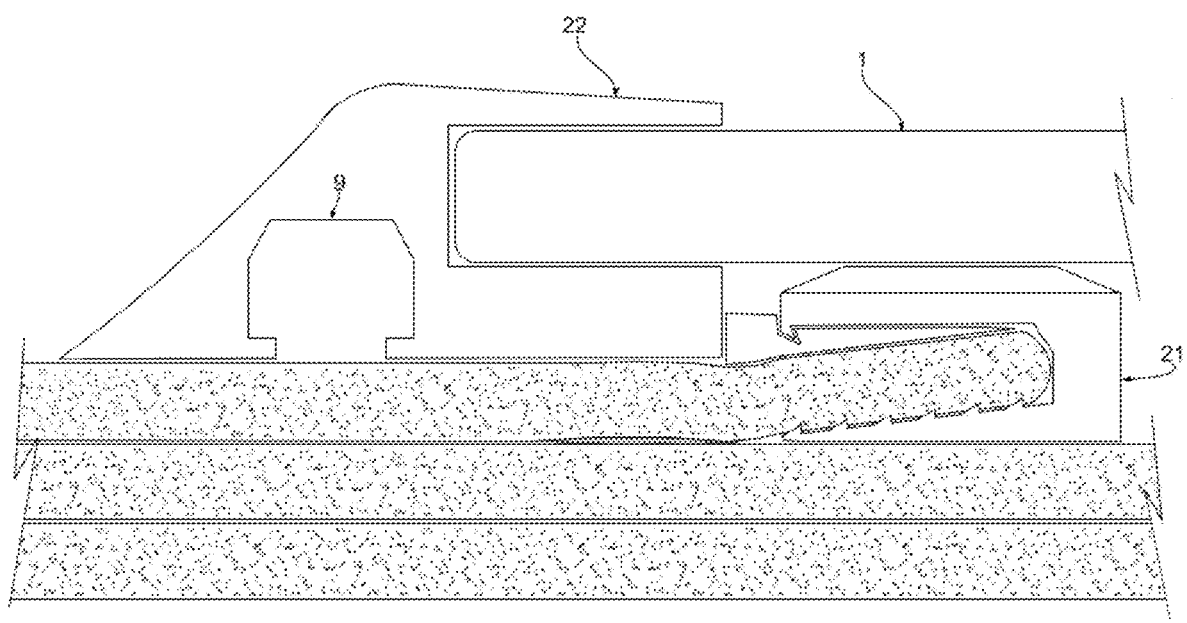
FIG. 8 is a side sectional view of the top framing member of the apparatus.
Figure 10:
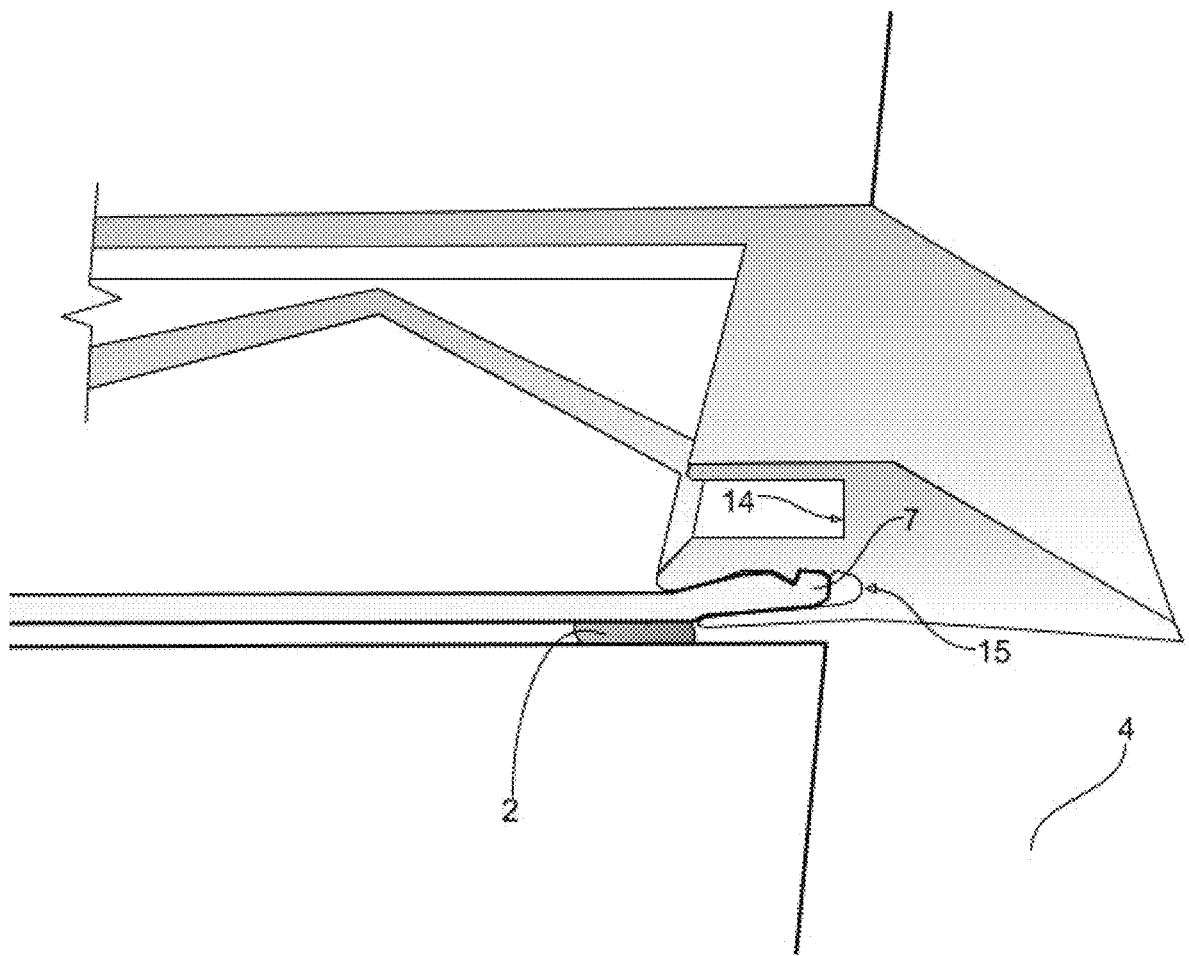
FIG. 10 is a side view illustrating a detail of the 3D printed apparatus
Figure 11:
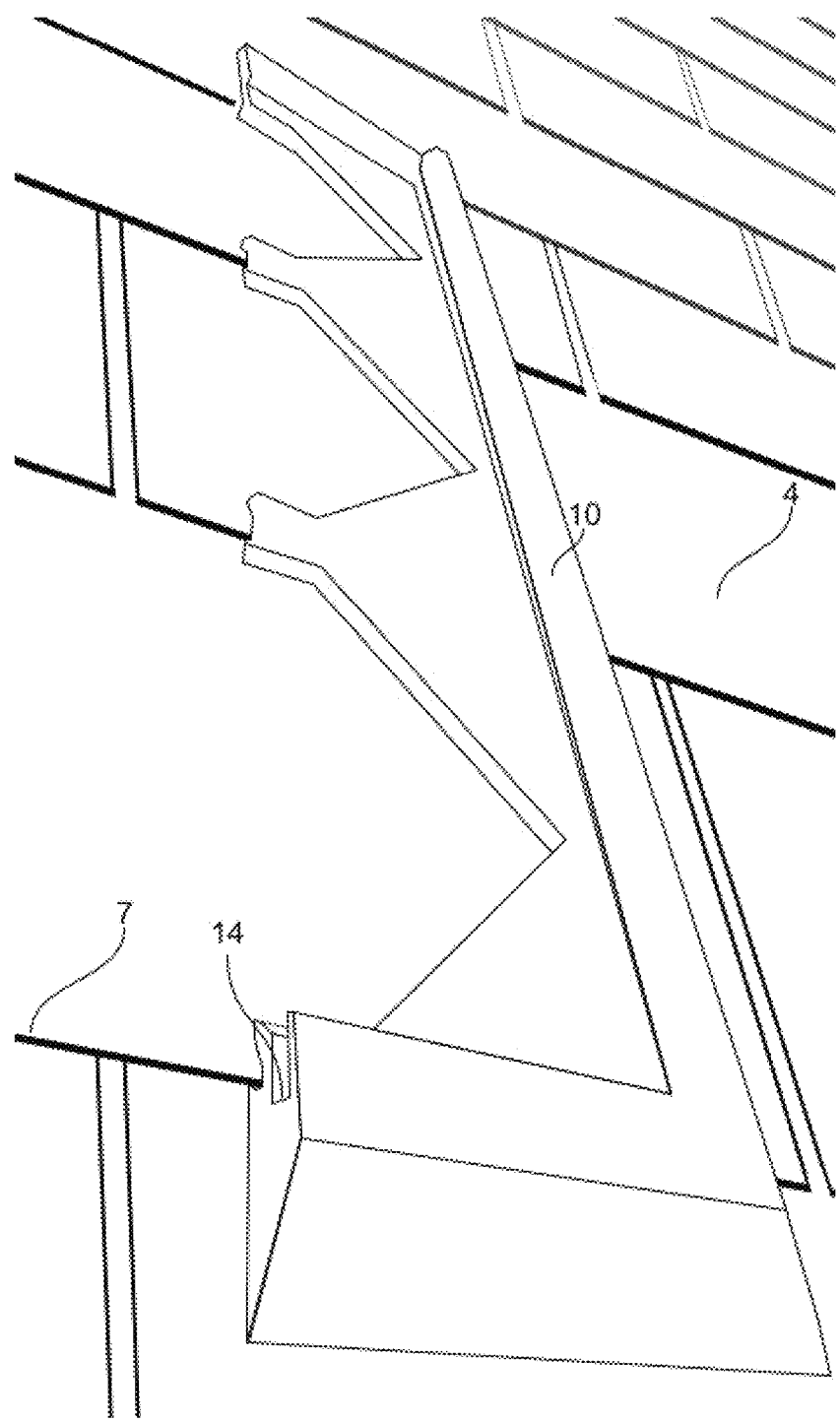
FIG. 11 depicts a 3D printed side sectional of the apparatus
Figure 12:
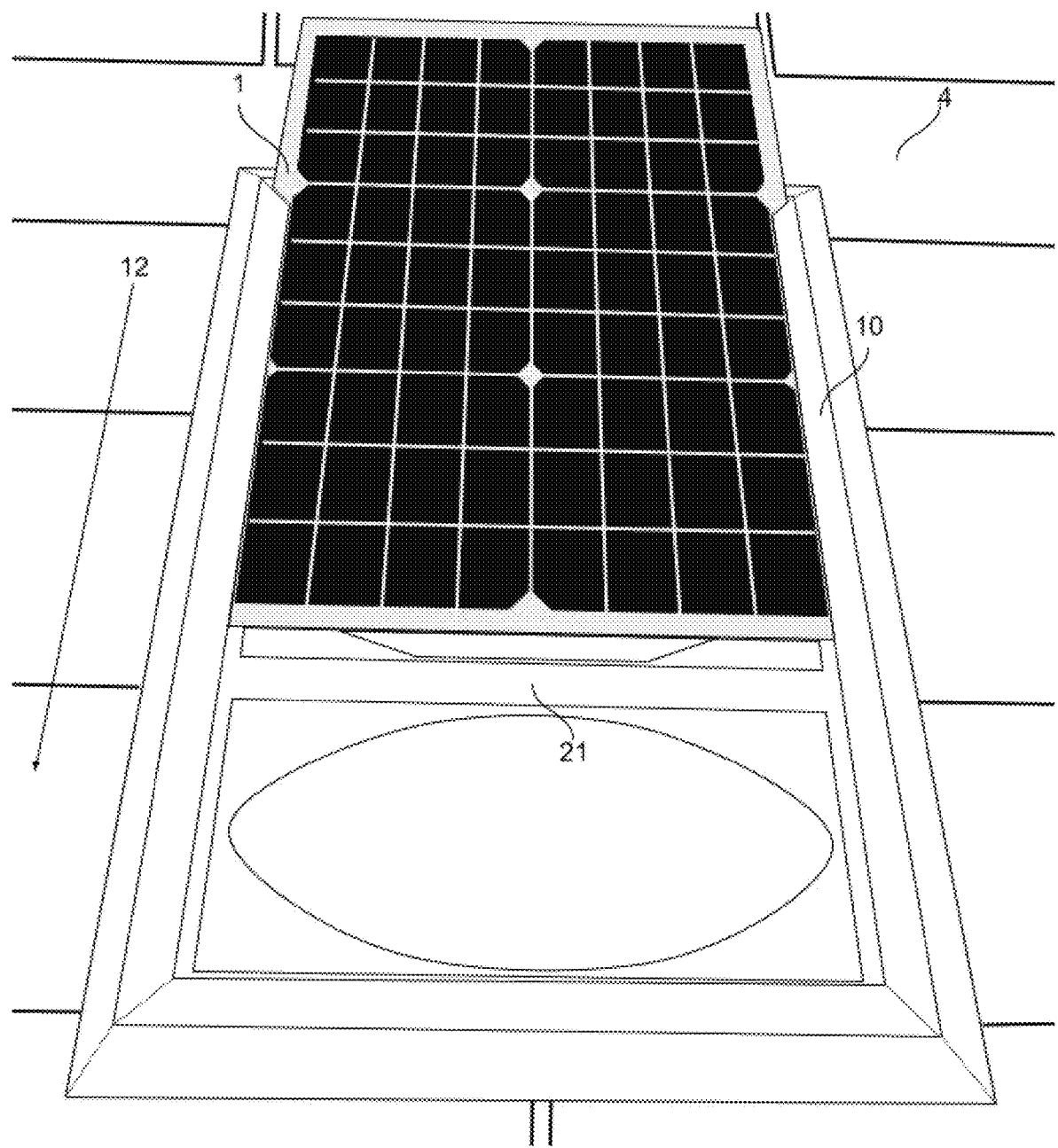
FIG. 12 illustrates a semi-flexible solar panel been installed using a 3D printed apparatus of the invention.
Figure 12A:
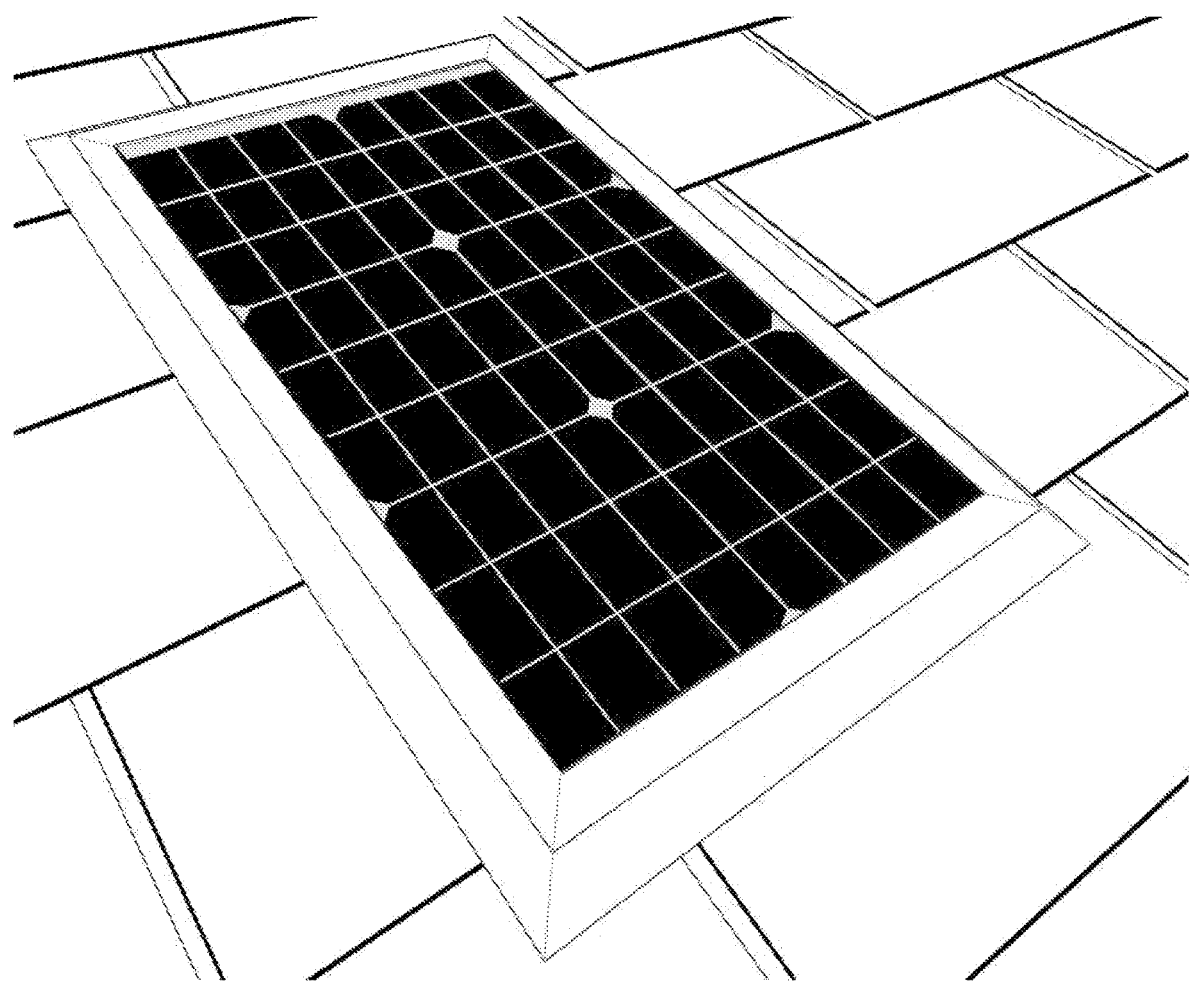
FIG. 12A depicts a typical solar panel in situs on a roof and installed on a 3D printed prototype of the apparatus.

Referring now to FIGS. 2-9, the apparatus 10 is composed of four or more (depending upon configuration as explained below) framing members, which are extruded aluminum bars. Of course any material sufficiently hard and durable may be used to form framing members as would be apparent to one of skill in the art. It should be noted that framing members come in 4 different variations corresponding to the orientation of the particular framing member on the roof 4. Accordingly, there are bottom 13, left 25, right 26, and top 22 framing members. As can be seen in FIG. 5, a cross section of framing member 13 is shown. The base 33 of the member 13 flashes to the roof 4 and is pushed upward by the user so the end flap 7 of the upper shingle 44 is secured inside the lower groove 15 by pushing the stainless steel clip 5 downward and on the upper side of the end flap 7. The top groove 14 functions as a sliding guide for the edge of the solar panel 40, and as an anchor for the semi flexible solar panel 40 as shown in FIG. 2. The bottom groove's 15 purpose is anchoring the apparatus 10 to the roof 4 by sliding the shingles' 44 end flap 7 upward and into the bottom groove 15, locking with the stainless steel clip 5 the top anchoring tooth 6 and the bottom anchoring teeth 8.

The intermediate framing member 21 has the same anchoring function as the bottom framing member 13, and can vary in number, based on the dimensions and numbers of the flexible solar panels 40 deployed.

The left sidebar 25, and the right sidebar 26 are connected to the bottom bar 13 and the top bar 22 by a mitered corner connector 27 inserted in the groove 9 and tightened by the set screw 28. The end corners of all framing members, including bottom 13, side left 25, side right 26 and top member 22 have a cut 29 at a 45° angle, all 4 corners of the apparatus 10 are connected by mitered corner connectors 27. FIG. 4 shows a side sectional view of the apparatus 10 attached as per the method of the invention.

The role of the clip bending point 3 is to keep the area of the end flap 7 of the shingle from the downward edge of the sealing strip 17, the sealing strip 17 being already present in all 3 tab asphalt shingle systems (see especially FIG. 6) to the upward edge 18 of the groove 15 pressed down to the sealant strip below 2. Thus, the clip 3 applies sealing pressure to seal the end flap 7 to roof surface via the sealing strip 17 that is positioned on the roof.

In use, once side 25, 26, and bottom 13 framing members are positioned and secured on the roof 4, a solar panel 40 may be slid into position using side members 25, 26 as a guide. When fully inserted, the top member 22 may be positioned.

It is to be understood that the present invention is not limited to the sole embodiment described above, but encompasses any and all embodiments within the scope of the following claims:

I claim:

1. A frame securing a solar panel to a sloped roof comprising:
    a bottom framing member, said bottom framing member including an upper groove configured to receive a bottom edge of said solar panel, and a lower groove;
    a top framing member, said top framing member including an upper groove configure to receive a top edge said solar panel;
    a pair of side frame members each extending from said bottom frame to the top frame member;
    a plurality of intermediate framing members spaced apart from one another, said intermediate framing members extending from one of the side frame members to the other of the side frame members, each intermediate frame member including a lower groove;
    wherein the lower groove of the bottom framing member and each intermediate framing member are configured to receive an end flap of an asphalt shingle of a different course.

2. The frame of claim 1, wherein each lower groove comprising anchoring teeth configured to lock said end flap of the respective asphalt shingle.

3. The frame of claim 1, wherein said intermediate framing members are configured to anchor said side framing members to said sloped roof.

* * * * *